Figure 1:
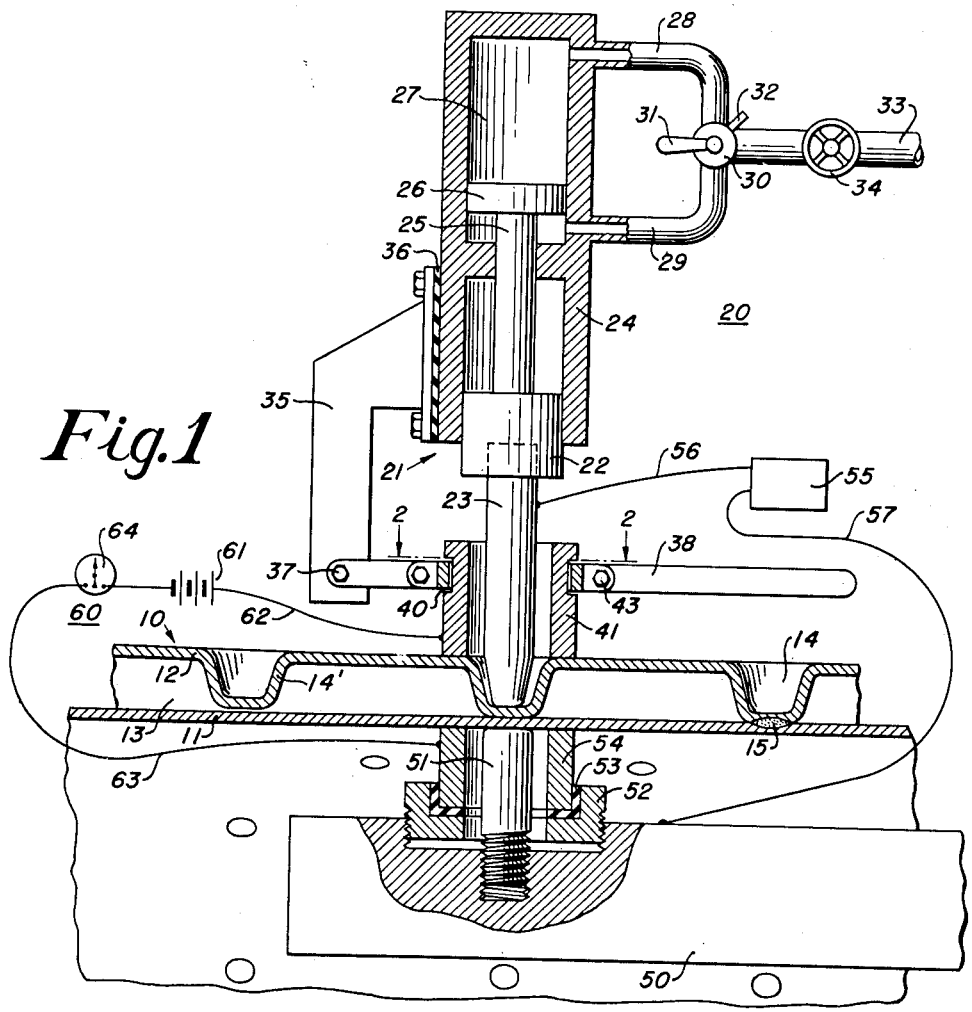

Feb. 14, 1956     M. B. MILLENSON     2,734,980

ELECTRIC SPOT RESISTANCE WELDING APPARATUS

Filed June 20, 1952

INVENTOR.
MORTON B. MILLENSON
BY
Virgil F. Davies
ATTORNEY

United States Patent Office 2,734,980
Patented Feb. 14, 1956

2,734,980

ELECTRIC SPOT RESISTANCE WELDING APPARATUS

Morton B. Millenson, Bayonne, N. J., assignor to The M. W. Kellogg Company, Jersey City, N. J., a corporation of Delaware Application June 20, 1952, Serial No. 294,623

1 Claim. (Cl. 219—4)

This invention relates to a method and apparatus for electric spot resistance welding shaped non-planar elements.

In electric spot resistance welding in accordance with the conventional methods, the parts to be united are initially positioned between the electrodes of the welding apparatus and the areas of said parts to be included in the weld brought into registry between the electrodes. Pressure is then applied on the parts to be united, generally by movement of the top electrode, to compress said parts between the electrodes. The electrode pressure is maintained while the electric current is passed through the weld area and the metal thereof is heated to form the weld. When the weld metal has solidified, the electrode pressure is released. The pressure imposed on the weld area is carefully chosen as it is an important factor in determining the quality and the strength of the finished weld. When the parts united are flat, substantially all of the pressure applied through the electrodes is effective to compress the metal of the weld area so that successive welds are made under substantially identical conditions and strong, uniform welds result. When, however, the parts to be joined are non-planar, and unless undue trouble and expense are incurred in accurately matting and fitting said parts, varying proportions of the pressure exerted through the electrodes is dissipated in bringing the areas of said parts that are to be included in the weld into registry. Thus, a pressure loading less than the predetermined pressure loading is obtained and the obtained pressure loading varies from weld to weld. All this results in welds of unpredictable quality and lower than desired strength.

It is the principal object of this invention to provide a novel method, and novel apparatus for carrying it out in practice, for electric spot resistance welding non-planar parts which provides welds of uniform character and of required strength.

It is a further principal object of this invention to provide a novel method, and novel apparatus for carrying it out in practice, for electric spot resistance welding non-planar parts in which a predetermined pressure loading of the areas of the parts incorporated in the spot welds is easily and substantially invariably obtained.

It is a still further important object of the invention to provide a novel method, and novel apparatus for carrying it out in practice, for electric spot resistance welding non-planar parts in which a force is applied to the parts sufficient to bring the areas thereof to be included in the weld into registry and close juxtaposition, said force to vary from weld to weld as necessary, and thereafter a second force is applied to said parts, independently of said first applied force, to impose a predetermined compression loading on said areas, the latter applied force being the same for all welds in said parts whereby welds of desired strength and predictable character are substantially invariably produced.

Figure 2:
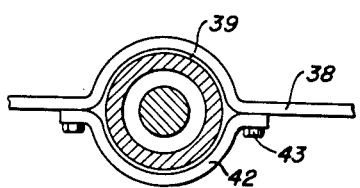

The further objects, features and advantages of the invention will become apparent from a consideration of the following detailed description thereof taken with the accompanying drawings in which:

Fig. 1 is a front view, partly in section, of the novel apparatus employed for carrying out the novel method of the invention; and Fig. 2 is a fragmentary sectional view taken on line 2—2 of Fig. 1.

While the invention is applicable to electric spot resistance welding generally, it is of particular application to the electric spot resistance welding of shaped parts, one, or both, of which includes the areas to be incorporated in the spot welds in a non-planar surface. With such non-planar parts, considerable "fit-up" is required when said parts are electric spot resistance welded by conventional methods and the welds produced are generally low in strength and of unpredictable quality. For the purposes of this application the invention will be disclosed in connection with the electric spot resistance welding of the cylindrical article 10 shown in Fig. 1. The article 10 comprises an inner cylindrical member 11 and an outer cylindrical member 12. The members 11 and 12 are concentrically arranged and spaced apart to provide therebetween the annular pressure chamber 13. To the end that the members 11 and 12 may be united into an integral structure by electric spot resistance welds, as well as to provide a chamber 13 of desired dimensions, to obtain the maximum use of the strength of the materials of the members 11 and 12, and to do all this cheaply and simply, the member 12 has the dimples 14 formed therein. The dimples 14 are generally conical in form with their external apices of somewhat greater area than the spot weld 15.

The electric spot resistance welding apparatus 20 shown in Fig. 1 is employed to produce the spot welds 15 and includes a conventional head 21 provided with a vertical reciprocatable bar 22 into whose lower end is threaded the top electrode 23. The bar 22 is supported for reciprocatory movement in the board support 24. For effecting such reciprocatory movement, the piston rod 25 has one end connected to the top end of the bar 22 and the other end to the piston 26. The piston 26 reciprocates in the cylinder 27 formed at the upper end of the support 24. The piston 26 may be driven by any of the usual media but since pressurized air is readily available in most shops, the use of pressurized air is indicated in this disclosure. Air is supplied to the top of cylinder 27 by the line 28 while the line 29 supplies air to the bottom of the cylinder. Each of lines 28 and 29 serves as an air outlet line when the other line is receiving pressurized air. The lines 28 and 29 are connected to a 4-way valve 30, provided with the usual operating handle 31. The vent line 32 and the pressurized air line 33 are also connected to the valve 30. The valve 30 is of conventional construction and is so arranged that when lines 33 and 28 are placed in communication to thereby drive piston 26 downwardly, lines 29 and 32 are in communication so that the lower side of cylinder 27 is vented to the atmosphere, and vice versa. A pressure control valve 34, also of conventional construction is provided in the line 33 so that the pressure of the air supplied to the cylinder 27 can be chosen at will.

A bracket 35 is mounted adjacent the lower end of the support 24, an insulation pad 36 being provided to electrically separate the bracket 35 from the support 24. The bracket 35 carries near its lower end a pivot pin 37 upon which is mounted the lever 38. Intermediate its ends the lever 38 is formed into a semi-circular configuration 39 which encircles part of the groove 40 formed adjacent the upper end of the pressure applying member 41. The bottom surface of the member 41 is shaped to conform with the shape of the work piece it engages in use. A member 42 also of semi-circular configuration encircles part of the groove 40 and is united to lever 38 by the rivets 43. Thus by moving the end of lever 38 downwardly, the pressure applying member 41 is carried downwardly to apply pressure to the work piece as required to bring the weld areas into intimate contact.

The electrical spot welding apparatus 20 also includes a fixed platen 50, supported in the usual manner, not shown. Into platen 50 is screwed the bottom electrode 51. A portion of the platen 50 surrounding the electrode 51 is bored and threaded to accommodate the gland member 52 which is hollowed on one side thereof to house a shaped insulation piece 53 upon which is mounted the bottom annular pressure applying member 54 whose upper end is shaped to conform to the shape of the work piece. For the purpose of this disclosure, the electric current supply and the various control arrangements therefor will be considered as located within the casing 55. From the casing 55 an electric conduit 56 extends to the electrode 23 and an electric conduit 57 extends to the platen 50 and adjacent the bottom electrode 51.

To facilitate the determination of proper registry and contact between the apices of the dimples 14 and the surface of the cylindrical member 12 a test circuit 60 is provided. The circuit 60 includes a current source 61 and leads 62 and 63 which respectively connect the pressure applying members 41 and 54 to the current source. A voltmeter 64 is provided in the lead 63 for indicating the voltage of the current flow through the circuit 60. The circuit 60 is closed when pressure member 41 is in contact with the cylindrical member 12, the apex of the dimple 14 is in contact with the cylindrical member 11 and the pressure member 54 is in contact with the cylindrical member 11. The voltage indication at meter 64 will vary inversely as the resistance of the contact between the apex of the dimple 14 and the surface of cylindrical member 11 and will increase to a maximum value when said resistance reaches its lowest attainable value. Thus in order to secure substantially constant contact conditions from weld to weld, before the electrode pressure is applied, pressure is applied through the lever 38 until the voltage indications at the meter 64 attains a predetermined value, usually a value somewhat less than said maximum value.

After the outer cylindrical member 12 has the dimples 14 formed therein by a pressing or other suitable operation, the cylindrical members 11 and 12 are assembled one within the other and clamped or otherwise temporarily united preparatory to welding. Since light gauge cylinders can seldom be rolled so that they are circular within close tolerances for the length thereof and since the pressing operation which results in the dimples 14 tends to distort the cross-section of the cylindrical member 12, the apices of the dimples 14 will not all contact the surface of the cylindrical member 11. Some of said apices will contact the surface of the cylindrical member 11 while others, as for instance the dimple 14', Fig. 1, will be spaced a substantial distance therefrom. The spacing of the non-contacting dimples will obviously not be uniform.

The unit formed by the assembled cylindrical members 11 and 12 is positioned beneath the electrode 23 with one of the dimples 14 in registry with said electrode. The lever 38 is then moved downward to engage pressure applying member 41 with the surface of the cylindrical member 12 surrounding the dimple 14 and pressure is applied through the lever 38 to move the member 41 downward until the voltage indication at the meter 63 reaches the predetermined value. The lever 38 may be locked in this position by any convenient and well known means, not shown. The pressure valve 34 having been set to supply the air at the pressure required by the predetermined pressure loading of the weld areas, the handle 31 is manipulated to place the line 28 in communication with the line 33 so that the pressurized air drives the piston 26 downwardly and with it the electrode 23 to apply the predetermined pressure loading to the portions of the cylindrical members 11 and 12 between the electrodes 23 and 51. When the limit of movement of the piston 27 is reached the welding current circuit is closed and maintained closed until the flow of current through the portions of the members 11 and 12 between the electrodes 23 and 51 has fused sufficient of the metal at the interface of said members 11 and 12 to form the weld 15. After the welding circuit is opened and the metal of the weld 15 has solidified, the handle 31 is manipulated to communicate the line 29 with the line 33 to thereby flow air into the bottom of the cylinder 27 so that the electrode may be raised to its original position. The lever 38 is then raised and the work moved to bring a second dimple 14 in welding position. The described welding procedure is repeated at each dimple 14 until all of them have been welded to the cylindrical member 11.

While the invention has been described with particular reference to a specific embodiment, it is to be understood that it is not to be limited thereto, but is to be construed broadly and restricted solely by the scope of the appended claim.

I claim:

In electric spot resistance welding apparatus, a pair of opposed electrodes, means fixedly mounting one of said electrodes, means supporting the other of said electrodes for longitudinal movement, pressure applying means operable on said other electrode to move said other electrode longitudinally to apply a predetermined pressure loading on work parts positioned between said electrodes, an annular contact member adjacent to and surrounding said one electrode and fixedly position relative thereto adapted to contact portions of the work parts immediately adjacent to and surrounding the portion of the work parts adapted to be contacted by said one electrode, a longitudinally movable annular pressure applying member immediately adjacent to and surrounding said other electrode, and means operable independently of said electrode to move said annular pressure applying member into contact with portions of the work parts immediately adjacent to and surrounding the portion of the work parts adapted to be contacted by said other electrode to apply pressure thereto to move said work parts into contact with one another.

References Cited in the file of this patent

UNITED STATES PATENTS

| 508,037 | Moxham | Nov. 7, 1893 |
| 1,243,004 | Taylor | Oct. 16, 1917 |
| 1,259,271 | Murray | Mar. 12, 1918 |
| 1,534,422 | Smith | Apr. 21, 1925 |
| 2,066,791 | McBain | Jan. 5, 1937 |
| 2,109,461 | Brown | Mar. 1, 1938 |
| 2,376,692 | Heim | May 22, 1945 |
| 2,618,725 | Renard | Nov. 18, 1952 |

FOREIGN PATENTS

| 372,999 | Germany | Feb. 8, 1921 |